United States Patent [19]

Gettert et al.

[11] Patent Number: 4,728,437

[45] Date of Patent: Mar. 1, 1988

[54] TREATMENT AND DISPOSAL OF WASTEWATERS CONTAINING CARBON BLACK AND ASH

[75] Inventors: Hans Gettert, Moerlenbach; Knut Kaempfer; Bruno Sander, both of Ludwigshafen; Siegfried Marquardt, Bobenheim-Roxheim; K. Robert Mueller, Heidelberg, all of Fed. Rep. of Germany

[73] Assignee: BASF Aktiengesellschaft, Ludwigshafen, Fed. Rep. of Germany

[21] Appl. No.: 894,808

[22] Filed: Aug. 8, 1986

[30] Foreign Application Priority Data

Aug. 9, 1985 [DE] Fed. Rep. of Germany ....... 3528598

[51] Int. Cl.$^4$ ................................................ C02F 1/54
[52] U.S. Cl. ..................................... 210/710; 210/727; 210/738; 210/768; 210/751; 210/912
[58] Field of Search ............... 210/710, 725, 727, 728, 210/734, 738, 751, 768, 772, 912

[56] References Cited

U.S. PATENT DOCUMENTS

| | | | |
|---|---|---|---|
| 3,408,293 | 10/1968 | Dajani | 210/727 |
| 4,211,646 | 7/1980 | Westbrook et al. | 210/631 |
| 4,402,834 | 9/1983 | Bastgen et al. | 210/712 |
| 4,500,324 | 2/1985 | Vuong | 210/727 |

FOREIGN PATENT DOCUMENTS

| | | | |
|---|---|---|---|
| 0008425 | 7/1982 | European Pat. Off. | |
| 2738230 | 3/1978 | Fed. Rep. of Germany | 210/727 |
| 2920434 | 11/1980 | Fed. Rep. of Germany | |
| 50-21565 | 3/1975 | Japan | 210/912 |

*Primary Examiner*—Peter Hruskoci
*Attorney, Agent, or Firm*—Keil & Weinkauf

[57] ABSTRACT

Wastewaters which contain carbon black and ash and originate from high temperature processes and in which the carbon black is present in a very finely divided state and partially in a colloidal state are treated and disposed of by a process in which the wastewater is treated with calcium carbonate or calcium hydroxide and an organic flocculant and subjected to a two-stage filtration and the resulting filter cake containing carbon black and ash is subjected to an aftertreatment with an aqueous iron salt solution.

4 Claims, No Drawings

TREATMENT AND DISPOSAL OF WASTEWATERS CONTAINING CARBON BLACK AND ASH

The present invention relates to a process for the treatment and disposal of wastewaters which contain carbon black and ash and originate from high temperature processes and in which the carbon black is present in a very finely divided state and partially in a colloidal state.

In high temperature processes, for example in the production of synthesis gas by partial oxidation of oil residues, very finely divided carbon black is produced and has to be removed from the process. This is done predominantly by washing the carbon black-containing gas with water, waters containing from 0.5 to 5% of carbon black being obtained, depending on the procedure. The carbon black is present in the water in a very finely divided state and partially in a colloidal state. Depending on the starting material, the carbon black contains from 2 to 15% by weight of ash, which as a rule contains heavy metals such as vanadium and nickel. Other ingredients of the carbon black-containing waters are ammonia and sulfides. The pH is from 8.5 to 11.

Because of the finely divided nature of the carbon black and the toxicity of the heavy metals present therein, problems are encountered in the treatment and disposal of these carbon black-containing waters. Because of the chemical composition, they cannot in most cases be conveyed to biological treatment plants. Treatment by the conventional filtration methods is unsuccessful owing to the finely divided nature of the carbon black. The close-mesh filter fabrics required for the separation give only extremely low, economically unacceptable filter efficiencies and lives. Working-up with centrifuges gives solids contents of no more than 8% in the discharge. The centrifuged liquid contains up to 10% of the carbon black originally present.

Because of the high water content and in particular its toxicity, the carbon black sludge obtained cannot be dumped directly. This is shown by subjecting such carbon black sludges to the triphenyltetrazolium chloride test (TTC test, L3 of the German Standard Methods for Water Testing) and by the elutability of vanadium and nickel with water.

It is an object of the present invention to treat or modify the carbon black-containing wastewaters by suitable measures so that the carbon black can be separated off with high throughput and a high degree of separation in very high concentrations by conventional solid/liquid separation methods to form a solid, lumpy carbon black residue having a consistency which makes it suitable for dumping.

It is a further object of the present invention to eliminate the toxicity of the carbon black residue and the elutability of vanadium and nickel while retaining the solid, lumpy state in order to ensure that the residue can be dumped.

We have found that these objects are achieved, according to the invention, if (a) calcium carbonate or calcium hydroxide is added, in an amount of from 2 to 10 kg/m$^3$, to the wastewaters,
(b) an aqueous solution of an organic flocculant, preferably an anionic flocculant, is thoroughly dispersed in the waste waters in the course of from 1 to 2 seconds,
(c) the flocculated suspension is treated in a flow-through stirred container for from 30 to 180 seconds while stirring at speeds of from 5 to 20 min$^{-1}$,
(d) immediately thereafter the flocculated suspension is subjected to gravity filtration,
(e) the carbon black sludge obtained is then immediately dewatered further by pressure filtration under from 0.5 to 15 bar and
(f) the resulting presscakes are aftertreated by dripping onto it, or spraying it with, an aqueous iron salt solution, preferably an FeCl$_3$ solution, in an amount corresponding to 1–20 kg of iron salt (calculated as 100%) per tonne of filter cake, while retaining the solid, lumpy state.

In a further embodiment of the invention, in process step (c), the flocculated suspension is treated in the course of less than 60 seconds in static line mixers which possess coils or cross-sectional constrictions in their interior, and then further processed as described above.

The calcium carbonate or calcium hydroxide used may be any commercial product, preferably a waste from a manufacturing process, having a particle size of up to 0.1 mm, and may be employed in the form of an aqueous suspension or as a solid.

Mixing with the carbon black-containing water is carried out by stirring into the said water in a stirred container. Suspensions may also be metered directly into the line for carbon black-containing water, mixing being effected in a downstream static mixer.

The calcium carbonate or calcium hydroxide binds the nickel to the solid, thus counteracting elution of the nickel.

The organic flocculants used are commercial ones. These are water-soluble, macromolecular compounds which are obtained by polymerization or by copolymerization of, for example, acrylamide, acrylic acid and/or its salts or of esters of acrylic acid or methacrylic acid which have been specially modified via their alcohol component, eg. an amino alcohol. Furthermore, these flocculants differ from one another in their electrical charge (cationic, anionic or electrically neutral) and in their degree of polymerization.

A suitable flocculant is chosen, both in terms of type and amount, by known methods on a laboratory scale. Such methods are described in European Pat. No. 0,008,425. In the process according to the invention, anionic flocculants have proven particulary useful. The amounts of flocculant required are from 1 to 10 g/kg of carbon black.

The flocculants are used in the form of their 0.05–0.2% strength aqueous solutions. The preparation of such dilute flocculant solutions from the solid or liquid commercial products is carried out by a conventional method in a commercial apparatus.

The flocculant solutions are metered directly into the line for carbon black-containing water, downstream of the pump for this water. Feed aids, eg. a cone mixer or a static line mixer with a narrow cross-section may be advantageous for this purpose.

After this preliminary mixing, the flocculant-containing carbon black water is pretreated with the aqueous 0.05–0.2% strength flocculant solution. The pretreatment may be carried out in a stirred container (dynamic flocculation reactor) through which the material flows vertically upward, in the course of from 0.5 to 3 minutes, at stirrer speeds of from 5 to 20 min$^{-1}$. The maturing time and the most advantageous amount of energy to be supplied can be determined by the method described in DE-A No. 29 20 434.

The pretreatment can be carried out just as successfully in static line mixers which possess coils or cross-sectional constrictions in their interior. Because of the particular hydraulic conditions, the maturing times in this case are less than 60 seconds. As a rule, a plurality of mixer elements are connected in series. This mixing zone (static flocculation reactor) then forms parts of the line for carbon black-containing water.

This pretreatment imparts optimum dewaterability to the water containing carbon black. In carrying out the novel process, it is critical to select a flocculant which, after the flocculation reaction in the flocculation reactor (stirred container or static line mixer), makes the suspension particularly readily dewaterable by gravity, since the major part of the water is to be separated off purely by gravity filtration.

After the pretreatment described, the flocculated carbon black-containing water is fed to a dewatering apparatus and subjected to gravity filtration. Suitable dewatering apparatuses for carrying out the gravity filtration are belt-type filters or drum filters. In a preferred embodiment, the belt-type filter can be the lower belt of a belt-type filter press.

Drum filters consist of a cylindrical cage, over the surface of which a filter fabric has been stretched. The filter fabric can consist of metal wire or of synthetic fibers, eg. polypropylene or polyester fibers. The drum filters may furthermore possess in their interior, surface-regenerating baffles, so that the resulting carbon black sludge is thoroughly turned over on passing through. Baffles of this type are deflector plates, weirs or hollow coils. The residence time of the carbon black suspension to be dewatered, in the drum filter, is determined not only by the length of the apparatus and the throughput but also by the level of the charge. The drum filters operate, for example, at speeds of from 1 to 20 $\text{min}^{-1}$. The residence times in this dewatering stage are from 1 to 10, in particular from 2 to 5, minutes.

By means of gravity filtration on the stated apparatuses, solids contents as high as 10% are achieved and up to 88% of the water is separated off in the high temperature processes, depending on the initial concentration and the type of starting materials.

After this preliminary dewatering, the carbon black sludge is subjected to pressure filtration, the continuous pressure zones of belt-type filter presses preferably being used. Filter presses or membrane filter presses are also suitable.

Since the gravity filtration can be carried out in the first process stage of a belt-type filter press, ie. the filtering zone, and the second process stage of this press, comprising the wedge and pressure zones, is suitable for the pressure filtration, belt-type filter presses are particularly suitable for carrying out the novel process by a continuous procedure.

Belt-type filter presses separate off 90% or more of the carbon black to be removed. The resulting filter cakes are firm and lumpy and have a solids content of from 20 to 27%. They become detached automatically from the filter belt. The consistency of the filter cakes meets the requirements for dumping.

To convert the vanadium present into a water-insoluble or non-elutable form, the filter cake is also treated with a solution of an iron salt, preferably iron-(III) chloride. This is done by spraying with, or dripping on, a 5–20% strength solution of the salt. Depending on the starting material and the procedure, from 1 to 20 kg of iron salt (calculated as 100%) are required per tonne of filter cake. Surprisingly, the firm, lumpy state of the filter cake can be retained during this procedure.

When carbon black is separated off using a belt-type filter press, the iron salt solution is dripped on to the filter cakes, over their entire width, shortly before they are ejected from the filter belt. The drops penetrate the filter cake in the course of from 1 to 5 seconds.

The aqueous extracts of the filter cakes thus prepared (1 part filter cake stirred with 4 parts of water for 24 hours at 25° C.) have a TTC value greater than −40 and vanadium and nickel contents of less than 1 mg/l and thus meet the requirements for depositing on a dump. The Examples which follow illustrate the invention.

EXAMPLES

In the Examples below, aqueous scrubbing liquors from a high temperature process are used, these liquors being referred to below as carbon black waters and containing from 0.8 to 2% of very finely divided carbon black with an ash content of from 2 to 15%. The ash consists of from 15 to 25% of vanadium and from 5 to 15% of nickel.

EXAMPLE 1

2 g of calcium carbonate (finely divided precipitated product from a manufacturing plant, having a mean particle size of 52 μm and a water content of about 10%, based on dry substance) are introduced into 500 ml of carbon black water containing 2% of carbon black in the course of 1 minute, while stirring with a paddle stirrer (edge length 7×7 cm). 50 ml of a 0.05% strength solution of an organic flocculant which is 20% anionically modified are then added, and stirring is continued for a further 30 seconds at a stirrer speed of 200 $\text{min}^{-1}$. The suspension is then introduced onto a Büchner funnel having a diameter of 12 cm and containing a polypropylene linen filter cloth, and is subjected to gravity filtration. The amount of filtrate and the solids content of the residue are determined as a function of the filtration time and of the solids content in the filtrate.

| Filtration time min | Amount of filtrate ml | Solids content of the residue % | Solids content of the filtrate g/l |
|---|---|---|---|
| 1 | 300 | 4.0 | — |
| 2 | 350 | 5.0 | — |
| 5 | 370 | 5.6 | 0 |

The filtration residue is subjected to pressure filtration (compression) between two filter cloths in a laboratory ram press (filter area: 13.5×13.5 cm) for 2 minutes under a pressure of 10 bar to give a solid, dimensionally stable filter cake which disintegrates into pieces when broken and has a solids content of 26%.

A 7.5% strength aqueous solution of $FeCl_3$ is dripped uniformly onto one side of the filter cake, 9 g of $FeCl_3$ being employed per kg of filter cake. The drops penetrate the filter cake completely in the course of a few seconds. During this procedure, the filter cake retains its solid and lumpy state. After the filter cake has been stored for 24 hours, an aqueous extract of the filter cake is prepared and the TTC value and the nickel and vanadium contents are checked.

Results: TTC value: −10

Nickel content: less than 1 mg/l
Vanadium content: less than 0.5 mg/l

COMPARATIVE EXAMPLE 1

The carbon black water is treated as described in Example 1, except that water is added instead of the organic flocculant solution and the carbon black water is then subjected to gravity filtration in the same manner.

| Filtration time min | Amount of filtrate ml | Result: Solids content of the residue % | Solids content of the filtrate g/l |
|---|---|---|---|
| 1 | 90 | 2.2 | — |
| 2 | 120 | 2.3 | — |
| 5 | 220 | 3.0 | 1 |

Compression of the residue in a ram press and production of a filter cake are impossible owing to the inadequate dewatering.

COMPARATIVE EXAMPLE 2

A carbon black filter cake is prepared as described in Example 1, except that $CaCO_3$ is not added to the carbon black water and an iron salt solution is not dripped onto the filter cake. Investigation of the aqueous extract of this filter cake gives the following results:
TTC value: −60
Nickel content: 4 mg/l
Vanadium content: 127 mg/l

COMPARATIVE EXAMPLE 3

A carbon black filter cake is prepared as described in Example 1, except that an iron salt is not dripped on to the filter cake. Investigation of the aqueous extract of this filter cake gives the following results:
TTC value: −80
Nickel content: less than 1 mg/l
Vanadium content: 120 mg/l

COMPARATIVE EXAMPLE 4

A carbon black filter cake is prepared as described in Example 1, except that $CaCO_3$ is not added to the carbon black water. The following values are found for the aqueous extract of the filter cake:
TTC value: +20
Nickel content: 100 mg/l
Vanadium content: less than 0.5 mg/l Comparative Examples 1 to 4 show that, in order to convert the carbon black water to a filterable form, to prepare a firm filter cake and to ensure that the filter cake is suitable for dumping, 3 conditioners have to be added: an organic, preferably anionic, flocculant, calcium carbonate and an iron salt solution, preferably $FeCl_3$ solution.

EXAMPLE 2

A carbon black filter cake is prepared as described in Example 1. However, instead of 2 g of $CaCO_3$ per 500 ml of carbon black water, 1.5 g of calcium hydroxide in the form of a 15% strength suspension is stirred into the carbon black water. Investigation of the aqueous extract of this filter cake gives the following results:
TTC value: −0
Nickel content: less than 1 mg/l
Vanadium content: less than 0.5 mg/l

EXAMPLE 3

Calcium carbonate (specifications as in Example 1) is added to a 0.8% strength carbon black water in a stirred container, in an amount of 3 kg per $m^3$ of carbon black water. The suspension is fed to a horizontal drum filter having a diameter of 50 cm, a length of 180 cm and a mesh size of 0.3×0.4 mm), in a volume stream of 5.8 $m^3$/h Before the carbon black water passes into the filter, 230 l/h of a 0.1% strength solution of an organic flocculant which is 20% anionically modified is fed into the carbon black water line. The flocculated carbon black water flows through a container equipped with a paddle stirrer rotating at a speed of 20 $min^{-1}$, the residence time of the carbon black water in the said container being 2 minutes, and then flows freely out of the container into the drum filter (rotary speed: 4 $min^{-1}$). The carbon black sludge discharged from the drum filter has a carbon black content of 6.3%.

88% of the water is removed during the passage through the drum. The filtrate from the drum filter contains 0.2 g/l of carbon black, the degree of separation being 97%.

COMPARATIVE EXAMPLE 5

A drum filter is operated as described in Example 3, but without a flocculant being fed into the carbon black water. Virtually the total amount of carbon black water passes through the filter fabric. The carbon black cannot be separated off.

EXAMPLE 4

A carbon black water having a carbon black content of 1.1% is stirred in a stirred kettle with 6 kg of 65% strength aqueous $CaCO_3$ suspension per $m^3$ of carbon black water and then fed in a volume stream of 5.2 $m^3$/h to a belt-type filter press (belt width: 0.5 m). Before the carbon black water is introduced onto the filter belt of the belt-type filter press, 230 l/h of a 0.1% strength solution of organic flocculant which is 20% anionically modified is fed into the carbon black water line and mixed with the carbon black water by means of a cross-sectional constriction in the line. After a residence time of 30 seconds in the extended pipeline, the flocculated carbon black water passes onto the filter belt (length: 3.5 m, belt speed: 2 m/min). Here, a pressure-stable carbon black sludge containing 5.0% of carbon black is produced in the course of 1 minute, and a dimensionally stable filter cake containing 24% of carbon black is produced in the pressure or compression zone of the belt-type filter press. The discharge from the dewatering unit, including the wash water for the belt, contains 0.8 g of carbon black per liter. The degree of separation is 92%.

7.5% strength $FeCl_3$ solution is dripped onto the filter cake over its entire width, shortly upstream of the ejection point. 6 g of $FeCl_3$ (calculated as 100%) are metered in per kg of filter cake. The filter cake is firm and is lumpy after ejection, and it retains this state.

An aqueous extract is prepared from a sample of filter cake taken from the collecting container, and the TTC value and nickel and vanadium contents of the sample are checked.
TTC value: +10
Nickel content: less than 1 mg/l
Vanadium content: less than 0.5 mg/l

COMPARATIVE EXAMPLE 6

The belt-type filter press is charged with carbon black water as described in Example 4, except that no flocculant is metered into the carbon black water line. The dewatering rate in the filter zone is completely inadequate. At the end of the filter belt, the carbon black water still exhibits flow and has a carbon black content of only 1.5%. Consequently, the major part of the material is pressed out laterally between the upper and lower belts in the compression zone of the machine.

When organic flocculants are not added to the carbon black water, the belt-type filter press cannot be operated.

We claim:

1. A process for treating and disposing of wastewater which contain carbon black and ash and originate from high temperature processes and in which the carbon black is present in a very finely divided state and in which the ash contains vanadium and/or nickel, wherein
    (a) calcium carbonate or calcium hydroxide is added, in an amount of from 2 to 10 kg/m$^3$, to the wastewaters,
    (b) an aqueous solution of an organic flocculant is thoroughly dispersed in the wastewaters in the course of from 1 to 2 second to flocculate said carbon black.
    (c) the wastewaters are flocculated in a flow-through stirred container for from 30 to 180 seconds while stirring at speeds of from 5 to 20 min$^{-1}$,
    (d) immediately thereafter the wastewaters are subjected to gravity filtration to obtain a carbon black sludge,
    (e) the carbon black sludge is then immediately dewatered further by pressure filtration under from 0.5 to 15 bar, filter cake being obtained, and
    (f) the resulting filter cake is aftertreated to convert the vanadium and nickel present into a water-insoluble or non-elutable form by dripping onto it, or spraying it with, an aqueous trivalent iron salt solution, in an amount corresponding to 1–20 kg of iron salt (calculated as 100%) per 1000 kg of filter cake, while retaining the solid, lumpy state.

2. The process of claim 1, wherein, in process step (c), the wastewaters are treated in the course of less than 60 seconds in a static line mixter which possesses coils or cross-sectional constrictions in its interior.

3. The process of claim 1, wherein in process step (b) the organic flocculant is an anionic flocculant.

4. The process of claim 1, wherein the trivalent iron salt is FeCl$_3$.